Aug. 15, 1933.  F. DOREL ET AL  1,922,934
DEVICE FOR THE ELIMINATION OF CHROMATIC FLICKER IN PROJECTION APPARATUS
Filed Feb. 8, 1930

Inventors
Félix Dorel and
Elie Eugene Bellier

By Edward C. Sassett
atty.

Patented Aug. 15, 1933

1,922,934

UNITED STATES PATENT OFFICE 1,922,934

DEVICE FOR THE ELIMINATION OF CHROMATIC FLICKER IN PROJECTION APPARATUS

Felix Dorel and Elie Eugéne Bellier, Paris, France; said Dorel assignor to Société Francaise des Films Herault, Paris, France Application February 8, 1930, Serial No. 426,947, and in France March 20, 1929

1 Claim. (Cl. 88—16.4)

In certain cinematograph processes in natural colours, the successive pictures are selected when recording through the medium of a certain number of coloured filters which are always present in the same order.

When prints obtained by such processes are projected, these films having been tinted, or used in connection with suitable coloured filters, it is a fact that if the reproduction on a screen of natural colours is substantially perfect, there is produced on the other hand a most undesirable flicker due to colouration, and to which the name of chromatic flicker has been given.

The elimination of this particular flicker is necessary if the processes in question are to be exploited commercially.

If for example a three colour film is considered, in which the pictures are respectively tinted in the following order—red, green, blue, red, green, blue, etc. experience has shown that in projecting image by image it is necessary, in order to obtain a frequency which eliminates flicker, to project from 100 to 120 pictures per second. If it is desired to eliminate colour flicker whilst maintaining the normal speed of projection, it is necessary to project three images simultaneously. But neither of these solutions can be adopted in practice; the first because neither the apparatus nor the film could sustain such a high speed; secondly, because it is practically impossible to illuminate three images simultaneously in an equal manner.

Experience has shown that two images at the most can be illuminated equally and simultaneously.

The present invention has for its object means for eliminating chromatic flicker in a simple, effective, and practical manner.

The projection window being enlarged sufficiently to enable two consecutive pictures to be illuminated simultaneously, which pictures are superposed on the screen by suitable objectives, the invention consists essentially in placing at the most suitable point in the path of the luminous rays a particular contrivance which might be fixed in the case of certain projectors for the continuous unrolling of the film, but which might also be displaceable in the case of other projectors.

This device is divided into two halves, and comprises opaque portions and perforated portions, in any number, shape and dimensions whatever, but conforming to the essential condition that for each perforated portion in one of the halves, there is in the other half a corresponding opaque portion, these two portions being absolutely identical as to shape and dimensions.

The attached diagrammatic drawing, which is given by way of example, shows different methods of constructing the device.

Figure 1:
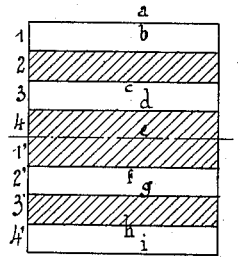
Figure 1 is an elevation of a plate having perforated or transparent portions and plain or opaque portions in acocrdance with one embodiment of the invention.

As shown in Fig. 1, the device comprises four transparent or perforated portions 1, 3, 2', 4', and four opaque portions 2, 4, 1', 3', which are rectangular in shape and which, as shown in the drawing, are of equal height, but which might be unequal as to their height. Assuming that this device, which in principle is formed by a perforated plate, is placed immediately in front or in rear of the double window of the apparatus or also immediately in front or in rear of the film, the dimensions of the device will in this case correspond to those of the double window which allows of the simultaneous passage of two consecutive pictures. The effective surface of the device will then be equal to that of the two pictures.

If it is assumed that the device thus constituted be fixed, and that the projection apparatus is of the type in which the film is unwound downwards in a continuous non-stop movement, the film being a print in which the pictures are tinted in the following order; red, green, blue, it may be assumed that when any point of a red picture reaches the point $a$ it is shown on the screen, during its passage from a to b. At the same time the corresponding point of the preceding picture, which is blue, is displaced from e to f but is hidden during this movement by the opaque part 1' of the device.

Whilst the same point of the said red picture is displaced from b to c, it is hidden by the opaque portion 2, whilst the corresponding point of the blue picture is projected on the screen during its passage from f to g.

What has just been explained is then repeated from c to d where the red point is projected, whilst from g to h the blue point is hidden. Finally, from d to e the red point is hidden, whilst from h to i the blue point is projected.

Thus, whilst the film has been displaced through the height of one picture, there have been produced on the screen four successive projections of the point considered, these projections having taken place in the following order—red, blue, red blue. If the film is unwound at a speed of 30 pictures per second, that is to say at a reasonably practical speed, there is obtained by means of the present invention, the following essential result, namely that the frequency of projection on the screen becomes four multiplied by 30 equals 120 pictures per second, which is a number which is recognized as being sufficient to eliminate color flicker.

The arrangement described in connection with red and blue pictures can be repeated in the same manner for red and green ones, also for green and blue, and so on.

It should be noted that the point of the picture under consideration has been projected on to the screen without any interruption, this being true for any point of the picture is true also for the whole of the picture.

Figure 2:
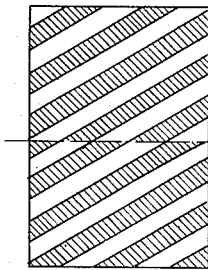
Figure 2 is a view similar to Fig. 1 illustrating that the transparent and opaque portions of the plate may extend diagonally relative to the direction of travel of the film.
Figure 3:
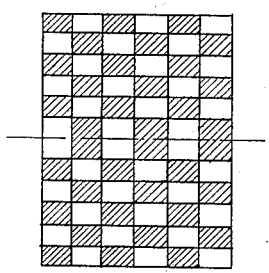
Figure 3 is a view similar to Fig. 1 illustrating that the transparent and opaque portions of the plate may be alternated laterally with respect to the direction of travel of the film as well as in the direction of travel thereof.
Figure 4:
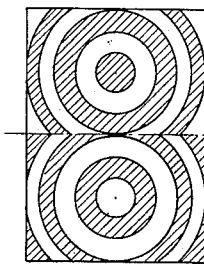
Figure 4 is a view similar to Fig. 1 illustrating that the transparent and the opaque portions of the plate may be of circular shape and arranged concentrically.

Figs. 2-4 show that the perforated portions on the one hand and the opaque portions on the other hand may not only be in any number, but may be of any conceivable shape. Their choice will depend on local conditions. In all figures, the perforated portions are shown white and the opaque portions are shown by hatching.

Instead of being plane, the device might be curved if the position of the film demanded it.

Figure 5:
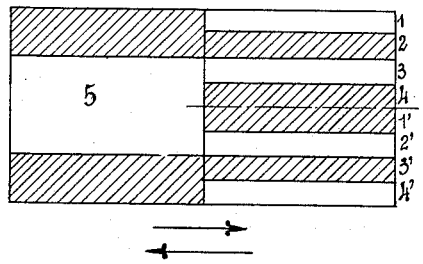
Figure 5 illustrates that a plate as in Fig. 1 may be used with another plate for the projection of three films.

It can also be employed for black projection, but in order to permit of the projection of a single picture at a time, if for certain reasons that should be desirable, there might be added, as shown in Fig. 5, an ordinary window 5 of the size of a single picture, and this would be placed in the position demanded by the direction of slip which would be horizontal in the case of Fig. 5.

In displacing the device in the direction of the arrows, it is possible to move or to position the two parts instantaneously in front of the luminous cone.

It has up to now been assumed that the device is fixed, but it might be rendered movable, and in fact this is necessary if it should be combined with projectors with intermittent displacement of the film, since the film is in this case stationary during each successive period of exposition or illumination.

The device might then have a longitudinal movement of translation imparted to it, and might be repeated as many times as necessary, in order that its action should be produced constantly. It might then be subjected to any other suitable method of displacement.

Figure 6:
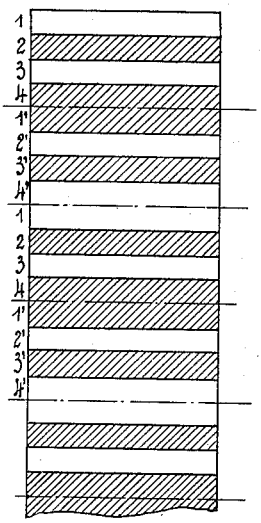
Figure 6 illustrates a strip for travel in a direction counter to the direction of travel of the film and provided with successive transparent and opaque portions as illustrated in Fig. 1.

By way of example, Fig. 6 shows the manner in which the device shown in Fig. 1 might be repeated when it is combined with a projector allowing the continuous displacement of the film without a shutter, the case in point being that in which the device is displaced in a direction parallel to that of the film, and at the same speed, but in the opposite direction. In this case, if the film is unwound at a speed of 30 pictures per second, the frequency obtained is no longer 120 per second, but 240.

From the foregoing it will be apparent that with the present device two consecutive pictures are superimposed simultaneously on the screen, and in each instance the portion of the picture masked by the upper half of the device will be projected from the other picture at the lower half of the device. In other words, while a portion of one picture is being projected, the corresponding portion of the other picture is hidden alternately.

What we claim is:

In a color cinematograph apparatus for superposed projection of two consecutive pictures of film, a device for the elimination of chromatic flicker, said device comprising a plate having an area equal to that of two consecutive pictures, the upper half of said plate corresponding to the area of one picture and the lower half corresponding to the area of the other picture, each half having transparent and opaque portions corresponding respectively to opaque and transparent portions of the other half.

FELIX DOREL.
ELIE EUGÉNE BELLIER.